United States Patent
Lack

(10) Patent No.: US 7,320,637 B2
(45) Date of Patent: Jan. 22, 2008

(54) FILTER WINDOW ADAPTER UNIT

(76) Inventor: Nicholas L. Lack, 90 Spyglass Cir., Palos Heights, IL (US) 60463

( * ) Notice: Subject to any disclaimer, the term of this patent is extended or adjusted under 35 U.S.C. 154(b) by 138 days.

(21) Appl. No.: 11/286,826

(22) Filed: Nov. 28, 2005

(65) Prior Publication Data

US 2007/0135034 A1    Jun. 14, 2007

(51) Int. Cl.
   *B60J 1/20*   (2006.01)
   *B60H 3/06*   (2006.01)
   *E06B 7/02*   (2006.01)

(52) U.S. Cl. .......................... 454/96; 454/97; 454/196

(58) Field of Classification Search ................. 454/96, 454/213, 97, 196; 49/183, 450; 160/DIG. 2
   See application file for complete search history.

(56) References Cited

U.S. PATENT DOCUMENTS

| | | | | |
|---|---|---|---|---|
| 1,402,101 | A * | 1/1922 | Smith | 160/239 |
| 2,026,175 | A * | 12/1935 | Imhofe | 160/102 |
| 2,639,004 | A * | 5/1953 | McIntyre | 55/482 |
| 2,703,158 | A * | 3/1955 | Hauck | 49/63 |
| 2,768,852 | A * | 10/1956 | Hicks | 292/175 |
| 3,698,308 | A * | 10/1972 | Navara | 454/213 |
| 3,826,182 | A * | 7/1974 | Navara | 454/213 |
| 4,042,004 | A * | 8/1977 | Kwan | 160/91 |
| 4,222,200 | A * | 9/1980 | Beirnes | 49/63 |
| 4,314,598 | A * | 2/1982 | Roesch | 160/90 |
| 4,546,693 | A * | 10/1985 | McTaw, Jr. | 454/128 |
| 4,651,797 | A * | 3/1987 | Lange | 160/290.1 |
| 5,379,824 | A * | 1/1995 | Carvalho | 160/90 |
| 5,492,551 | A * | 2/1996 | Wolfe | 55/496 |
| 5,649,389 | A * | 7/1997 | Coddens | 49/419 |
| 5,996,285 | A * | 12/1999 | Guillemet et al. | 49/213 |
| 6,279,266 | B1 * | 8/2001 | Searcy | 49/183 |
| 6,463,983 | B1 * | 10/2002 | Lang | 160/23.1 |
| 6,471,137 | B1 * | 10/2002 | Moore | 237/12.3 B |
| 6,499,527 | B1 * | 12/2002 | Lindley, Jr. | 160/28 |
| 2003/0213564 | A1* | 11/2003 | Pacholke | 160/98 |
| 2004/0055469 | A1* | 3/2004 | Kroculick | 96/134 |
| 2004/0065029 | A1* | 4/2004 | Morris | 52/204.5 |

* cited by examiner

*Primary Examiner*—Steve McAllister
*Assistant Examiner*—Patrick F. O'Reilly, III
(74) *Attorney, Agent, or Firm*—Davis Chin

(57) ABSTRACT

A filter window adapter unit adapted for use with a main split-sash window of school buses is provided. The adapter unit includes a mounting frame adapted to be installed over the main split-sash window of the school buses. An inner sash is disposed fixedly in a lower position in an inner track portion and carries a pane of glass. An outer sash is disposed movably in an outer track portion and carries an air filter. The outer sash is raised upwardly so as to cover a main window opening when the main split-sash is opened. As a result, the air filter prevents diesel fumes from the school buses from entering into the interior thereof.

10 Claims, 5 Drawing Sheets

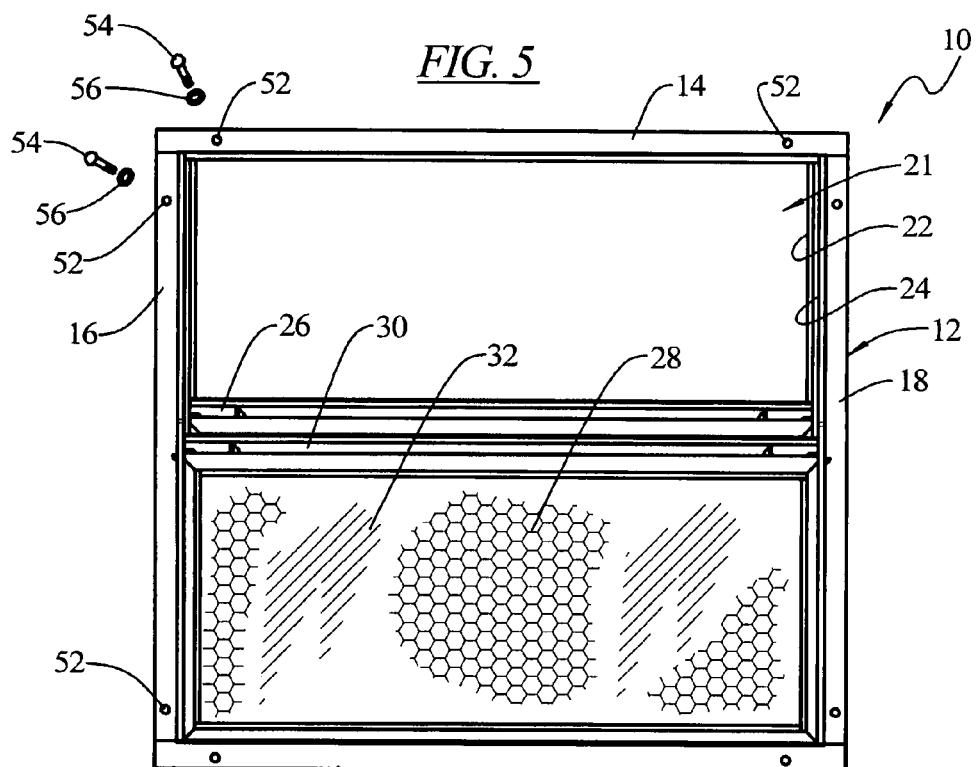
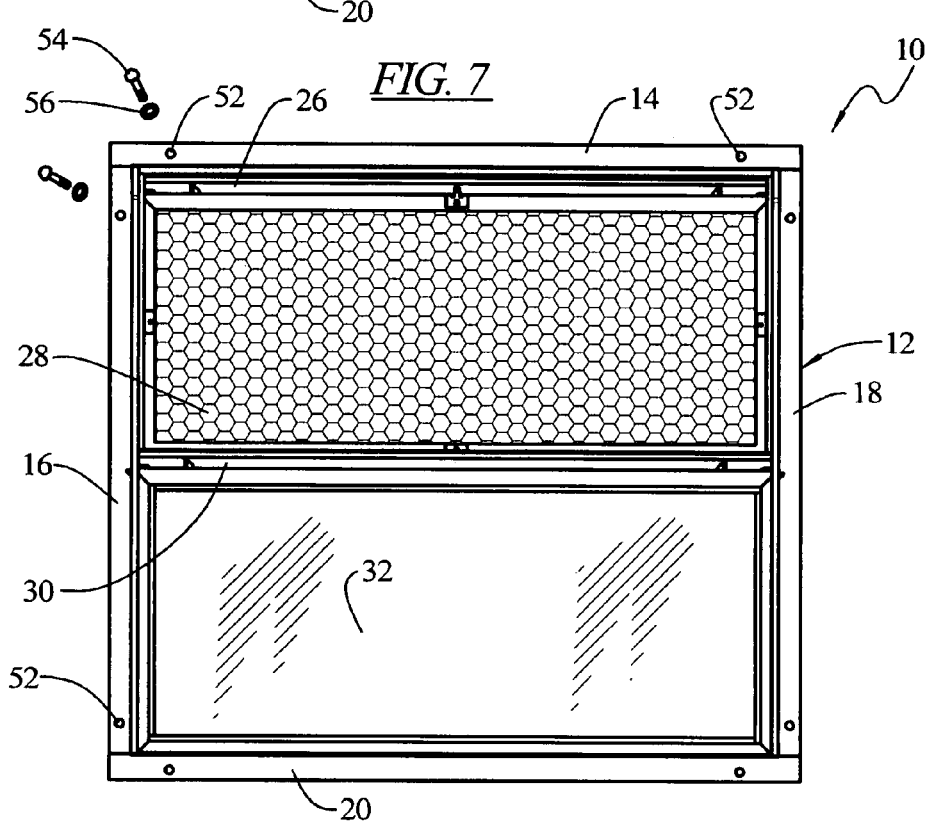

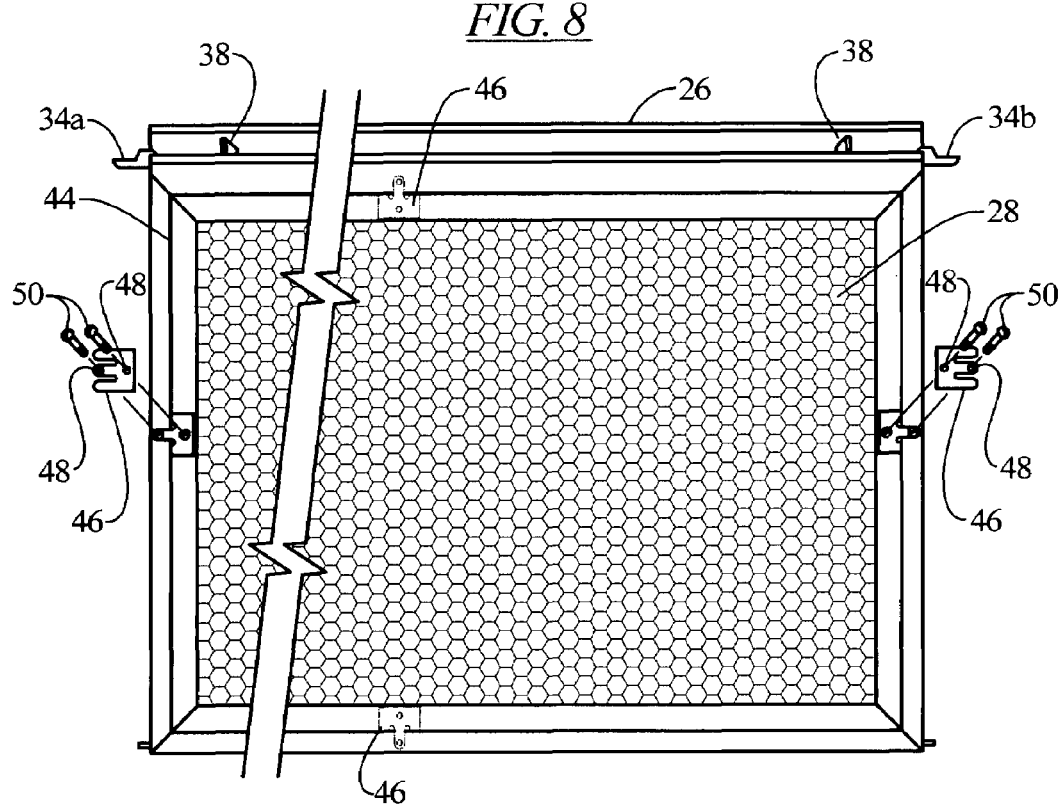
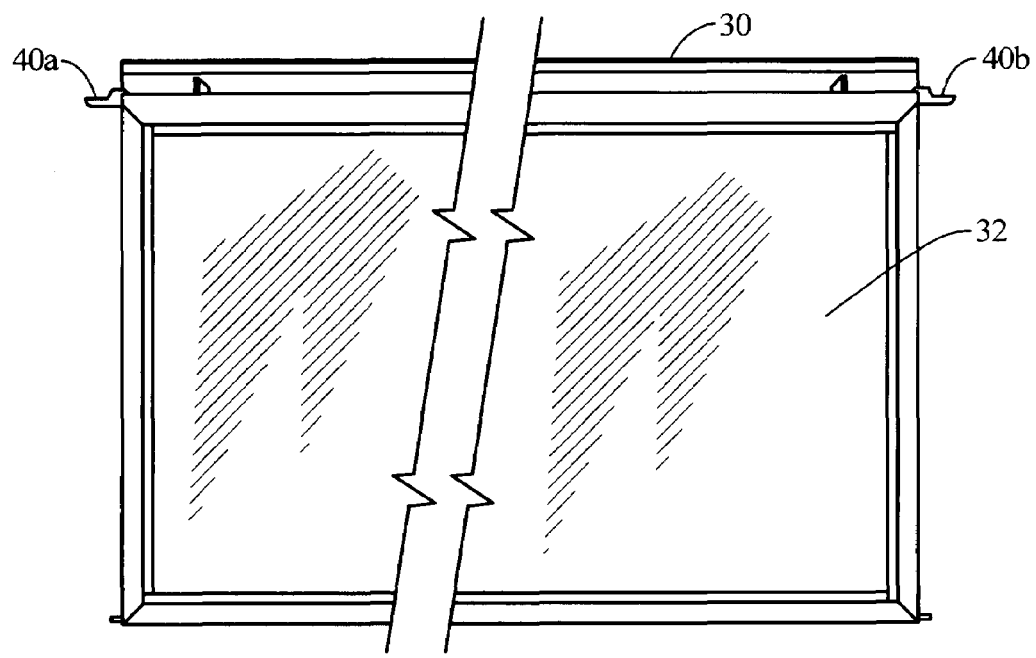

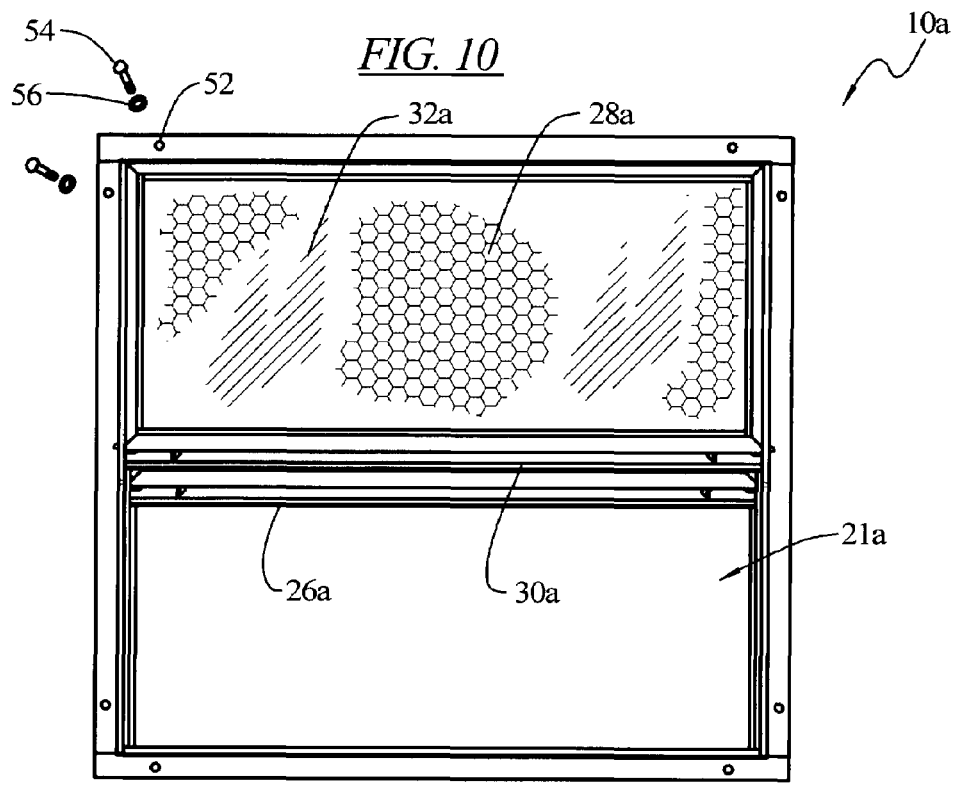
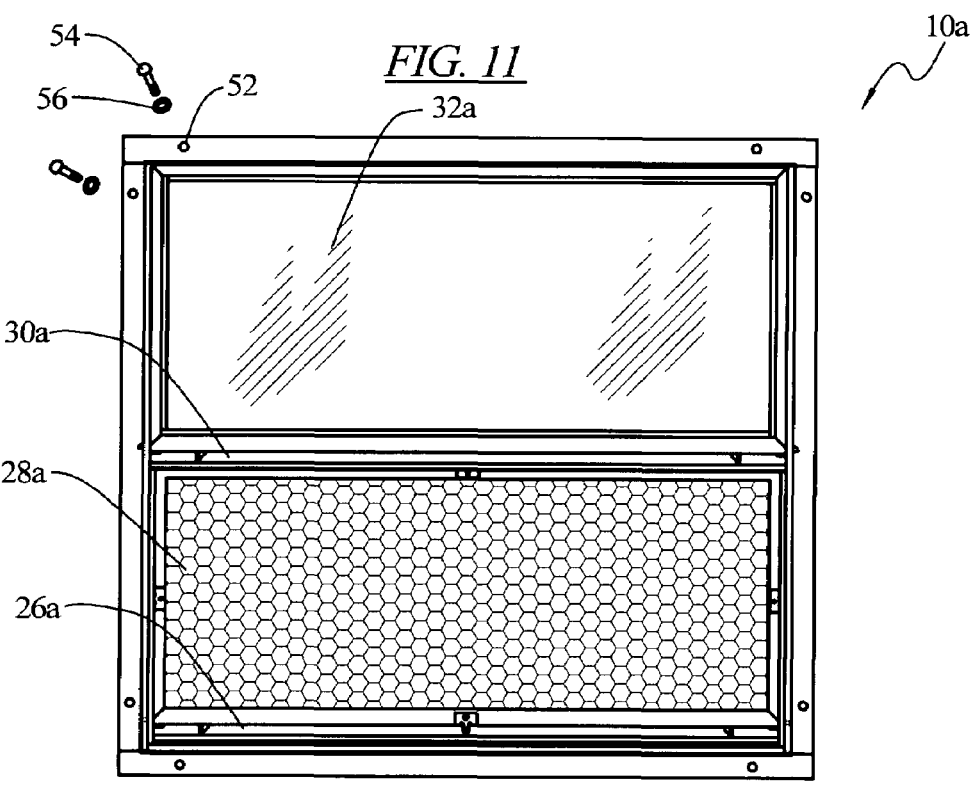

FILTER WINDOW ADAPTER UNIT

BACKGROUND OF THE INVENTION

1. Field of the Invention

This invention relates generally to window air filters. More particularly, the present invention relates to a filter window adapter unit for use with a main split-sash window of school buses, passenger coach vehicles, and the like.

2. Description of the Prior Art

As is generally known, school buses are used by state and local school districts for transporting children safely and conveniently between their homes and classrooms. These school buses are typically provided with windows of the type referred to generally as "split-sash" windows. The split-sash window design includes two panes of glass consisting of an upper pane and a lower pane defining the window. Each piece of glass is usually held by a frame disposed around its perimeter. The lower pane is fixed-in-place, and the upper pane is allowed to move downwardly so as to open the window and move upwardly so as to close the window. The purpose of permitting the opening of the window is to allow for ventilation in which fresh outside air flows through the window and into the interior of the bus.

However, these school buses are usually powered by a diesel engine. Unfortunately, the diesel-powered school buses emit very small soot particles and toxic gases that pose a significant health problem to the children. When inhaled, the diesel exhaust can aggravate allergies, trigger asthma attacks and cause serious respiratory illnesses, such as bronchial or pulmonary troubles. Heretofore, the technological steps taken to make the school buses a healthier place for the children have thus far only involved the retro-fitting of the school buses with a diesel oxidation catalyst. The diesel oxidation catalyst is used merely to control the emission of the diesel fumes coming directly from engines thereof. This present solution does not address the problem of pollutants entering into the school buses through the opened windows from the outside environment.

Given the fact that more often than not the budgets of state and local educational departments are stretched to the limit, any available assets on hand for modifying the school buses so as to filter the soot particles and toxic gases from the diesel engines must be used to their maximum potential. Accordingly, what is needed is a filter window adapter unit for school bus windows which is of a simplified construction, relatively low in cost, and can be easily installed or retro-fitted over the existing main bus windows.

A prior art search directed to the subject matter of this application in the U.S. Patent and Trademark Office revealed the following Letters Patent and application:

U.S. Pat. No. 1,402,101  U.S. Pat. No. 6,279,266
U.S. Pat. No. 2,639,004  U.S. Pat. No. 6,463,983
U.S. Pat. No. 3,826,182  U.S. Pat. No. 6,471,137
U.S. Pat. No. 4,651,797  U.S. Pat. No. 6,499,527

In addition to the above issued prior art patents, there were also found Patent Application Publication Nos. 2003/0213564 dated Nov. 20, 2003 and 2004/0065029 dated Apr. 8, 2004.

In U.S. Pat. No. 3,826,182 to Narava issued on Jul. 30, 1974, there is disclosed a window air filter which is mounted between a top sash of an upper window and a top window frame part. The filter medium of the air filter unit is contained within a housing which includes a mesh covering. The housing also includes a pair of channels, one being located at the top and the other one being located at the bottom of the air filter unit. End sleeves are slid over the respective channels. The filtering material is comprised of a charcoal impregnated material or charcoal granules.

In Published Patent Application No. 2004/0065029 to Morris dated Apr. 8, 2004, there is taught a removable portable window filter which fits inside a partially opened window or partially opened sliding glass door for preventing dirt and dust from entering a room by the outside air flowing around. The filter material is attached between two narrow parallel metal bars. The air filter is installed in the bottom opening of the window.

In U.S. Pat. No. 2,639,004 to McIntyre issued on May 19, 1953, there is taught window air filters each being mounted to a corresponding frame-like structure. Retainers are used to slidably secure the frames together. Two of the retainers are secured to the frame by a screw passing through a slot, which permits the retainers to have a sliding movement toward or away from each other.

U.S. Pat. No. 1,402,101 issued on Jan. 3, 1922 to Smith discloses a window frame in which is mounted a lower sash B and an upper sash C slidable in vertical planes. The lower sash B is shown in FIG. 1 to be partially raised and a ventilator frame D is inserted in the window frame under the bottom rail 1 of the lower sash B.

The remaining patents, listed above but not specifically discussed, are deemed to be only of general interest and show the state of the art in window screens and air filters installed in a window opening for filtering the air passing therethrough and preventing dust and dirt from blowing into the interior of a room.

None of the prior art discussed above disclosed a filter window adapter unit like that of the present invention which includes a mounting frame adapted to be installed over a main split-sash window of school buses and an outer sash with an air filter being movable so as to cover a main window opening when the main split-sash window is opened.

SUMMARY OF THE INVENTION

Accordingly, it is a general object of the present invention to provide a filter window adapter unit for use with a main split-sash window of school buses, passenger coach vehicles, and the like which is relatively simple and inexpensive in design, construction and operation.

It is an object of the present invention to provide a filter window adapter unit which can be retro-fitted with a main split-sash window of school buses on an efficient and cost effective basis.

It is another object of the present invention to provide a filter window adapter unit which includes a mounting frame adapted to be installed over a main split-sash window of school buses and an outer sash with an air filter being movable so as to cover a main window opening when the main split-sash window is opened.

In a preferred embodiment of the present invention, there is provided a filter window adapter unit adapted for use with a main split-sash window of school buses. The adapter unit includes a mounting frame adapted to be installed over the main split-sash window and having a top frame member, opposed side frame members, and a bottom frame member all formed integrally together to define an adapter window opening. An outer track portion is formed in the opposed side frame members and extends between the top and bottom frame members. An inner track portion is formed in the opposed side frame members adjacent to the outer track portion and extends between the top and bottom frame members.

An inner sash is disposed fixedly in a lower position in the inner track portion and carries a pane of glass. An outer sash is disposed movably in the outer track portion and carries an air filter. The outer sash is raised upwardly so as to cover a main window opening when the main split-sash is opened. As a result, the air filter prevents diesel fumes from the school buses from entering into the interior thereof.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 5 is a front plan of the filter window adapter unit, constructed in accordance with the principles of the present invention and illustrated in an inactive state;

FIG. 7 is a view similar to FIG. 5, but illustrated in the active state;

FIG. 8 is an enlarged plan view of the movable outer sash with filter of the adapter unit of FIG. 5;

FIG. 9 is an enlarged plan view of the inner sash with glass pane of the adapter unit of FIG. 5;

FIG. 10 is a front plan view of a second embodiment of a filter window adapter unit of the present invention, illustrated in an inactive state; and FIG. 11 is a view similar to FIG. 10, but illustrated in the active state.

DESCRIPTION OF THE PREFERRED EMBODIMENTS

Figure 1:
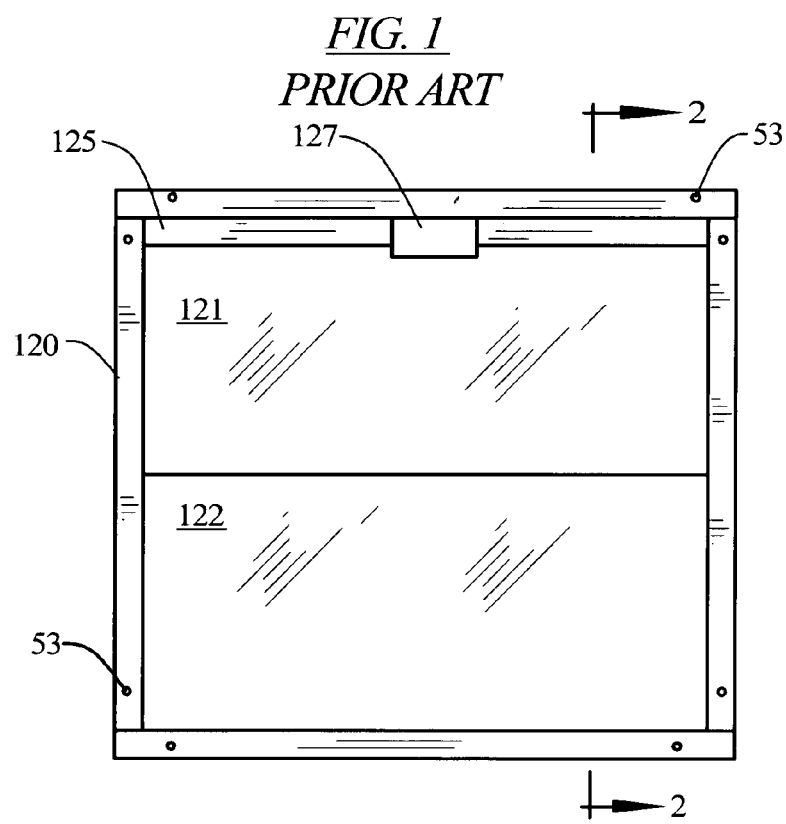
FIG. 1 is a front plan view of a conventional split-sash window used in a school bus, illustrated in a closed position.

It is to be distinctly understood at the outset that the present invention shown in the drawings and described in detail in conjunction with the preferred embodiments is not intended to serve as a limitation upon the scope or teachings thereof, but is to be considered merely as an exemplification of the principles of the present invention.

Figure 2:
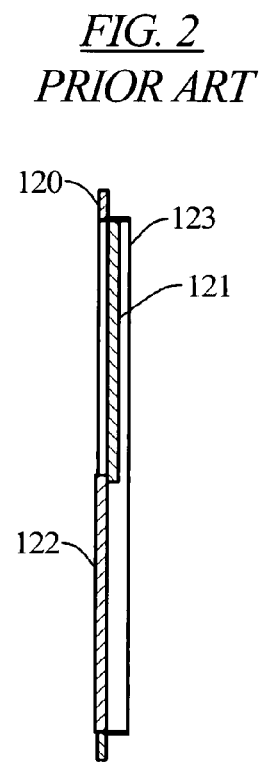
FIG. 2 is a side elevational view, taken along the lines 2-2 of FIG. 1.
Figure 3:
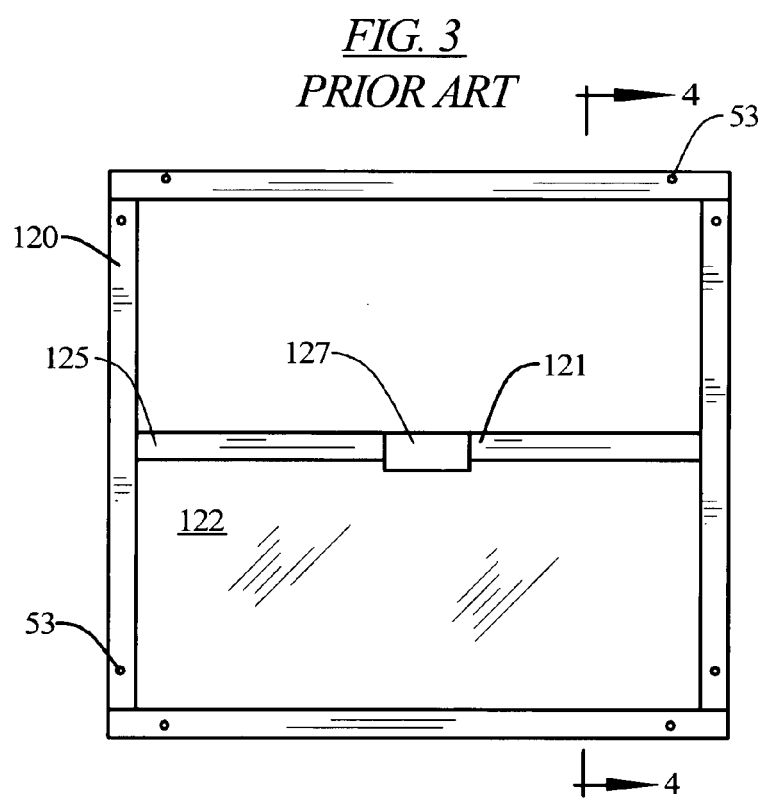
FIG. 3 is a front plan view similar to FIG. 1, but illustrated in an opened position.
Figure 4:
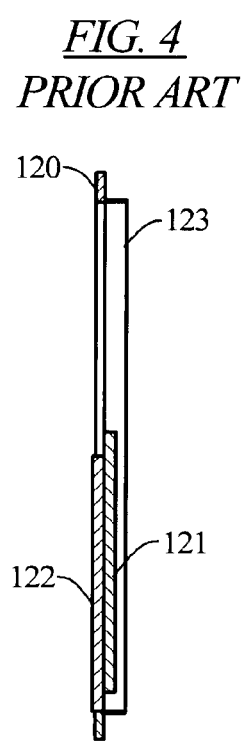
FIG. 4 is a side elevational view, taken along the lines 4-4 of FIG. 3.
Figure 6:
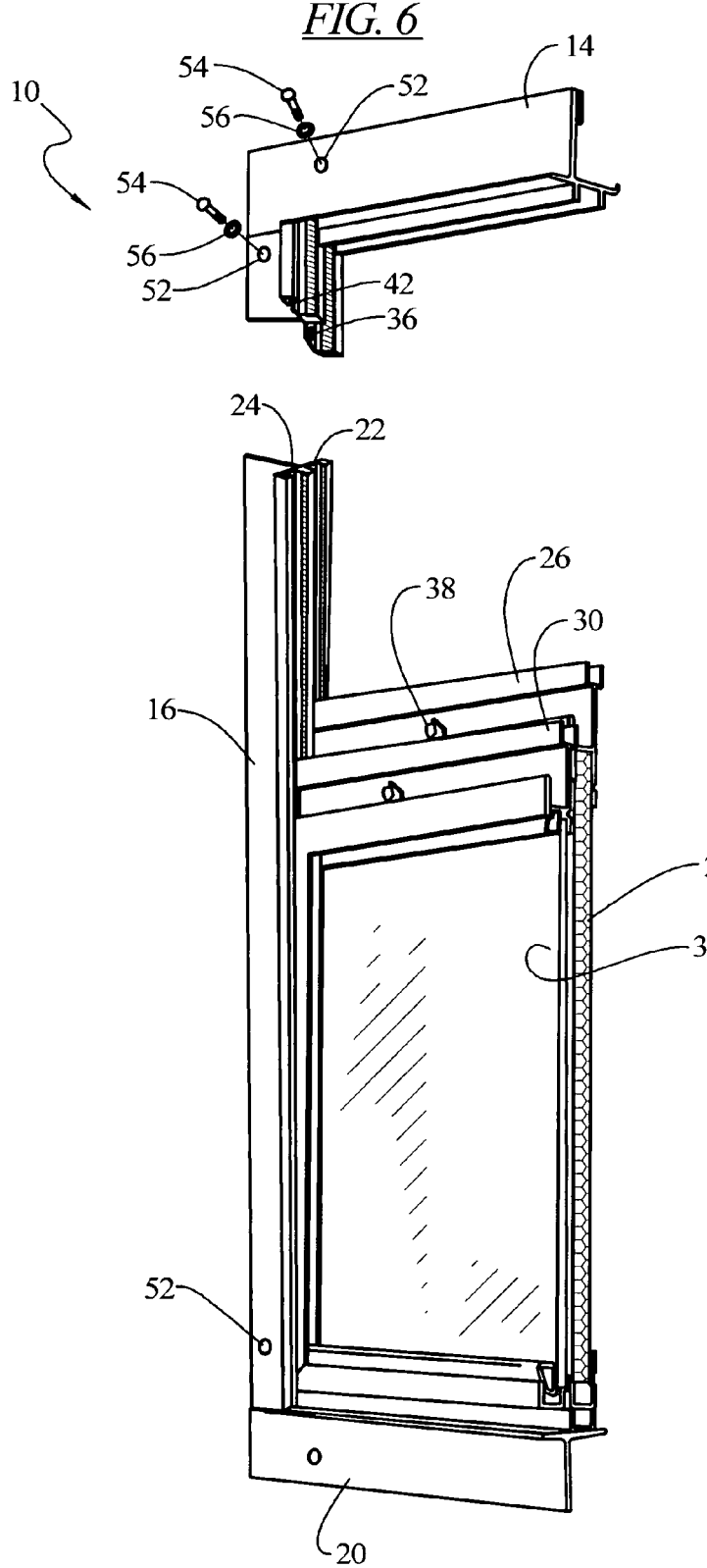
FIG. 6 is a partly, cut-away perspective view of the filter window adapter unit of FIG. 5.

As a background and for a better understanding of the present invention and its operation, reference is made initially to FIGS. 1 through 4 which show a conventional side window used in school buses, passenger coach vehicles, and the like of the type referred to as "split-sash" windows and labeled as "Prior Art". FIG. 1 is a front view of the split-sash window in a closed position. FIG. 2 is a side view of the split-sash window in the closed position. FIG. 3 is a front view of the split-sash window in an open position. FIG. 4 is a side view of the split-sash window in the open position.

The window frame 120 is of a generally rectangular configuration in which the base or width is typically longer than the height. A lower pane 122 of glass is fixed in position and is flush with the outer window frame 120. An upper pane 121 is movable downwardly to open the window (FIG. 3) and upwardly to close the window (FIG. 1) and slides within a fixed groove in the inner window frame 123. The upper pane 121 is operated to lower the same by grabbing the top rail 125 with one or both hands and then pushing up on the thumb bar 127. This releases latched bolts (not shown) and allows the upper pane 121 to travel vertically and downwardly to the open position depicted in FIG. 3.

In this open position of the bus window, the students traveling on the diesel-powered school buses will be exposed to the diesel exhaust which causes a health risk. In view of this problem, the inventor is unaware of any known means in the prior art of filtering of the pollutants entering into the school buses through the open windows from the outside environment. Therefore, the inventor has developed a filter window adapter unit of the present invention which is of a simplified low cost and is easy for retro-fitting of existing school buses so as to reduce and/or eliminate the problems caused by the emission of diesel fumes.

With reference now in detail to FIGS. 5 through 9 of the drawings, there is illustrated a filter window adapter unit 10, constructed in accordance with the principles of the present invention. The window adapter unit 10 includes a mounting frame 12 consisting of a top frame member 14, opposed side frame members 16, 18 and a bottom frame member 20, all formed integrally together to define an adapter window opening 21. The opposed side frame members 16 and 18 are formed with a first or outer track portion 22 extending between the top and bottom frame members 14 and 20. The opposed side frame members are also formed with a second or inner track portion 24 disposed adjacent to the outer track portion 22 and extending between the top and bottom frame members.

An outer sash 26 rides in the outer track portion 22 of the mounting frame 12 and carries an air filter 28 therein. An inner sash 30 rides in the inner track portion 24 of the mounting frame and carries a pane 32 of glass. The outer sash 26 is held in place in the outer track portion 22 with a pair of opposed spring-loaded bolts 34a, 34b located in the top part thereof and on each side therein. The bolts are made preferably of a metallic material and protrude outwardly from the sides of the outer sash and engage with one of a plurality of apertures or stops 36 formed in the outer track portion.

The outer sash is movable by moving the opposed bolts inwardly and against the outward lateral bias from a spring (not shown) so that the tips or ends of the bolts are no longer engaged in the apertures, thereby permitting the outer sash to move upwardly and downwardly. The bolts 34a, 34b are provided levers 38 for accommodating the fingers of a user so as to pinch the bolts simultaneously toward each other to free the outer sash.

Similarly, the inner sash 30 is held in place in the inner track portion 24 with a pair of opposed spring-loaded bolts 40a, 40b located in the top part thereof and on each side therein. The bolts are also made preferably of a metallic material and protrude outwardly from the sides of the inner sash and engage with one of a plurality of apertures or stops 42 formed in the inner track portion. The inner sash 30 is generally fixed-in-place and is not required to be moved upwardly and downwardly like the outer sash 26.

As can be best seen from FIG. 8, the outer sash 26 is of a generally rectangular shape and includes a ledge portion 44 for receiving the air filter 28 therein. The air filter is dimensioned with a width and a height so as to cover the size of the main window opening (upper window pane 121) in the school buses. The main window opening has a dimension of at least twelve inches in height and twenty-two inches in width. The air filter is preferably formed of an activated carbon filter type which has a relative adsorptive ability of diesel fumes so as to reduce and/or eliminate them from entering into the interior of the school buses. Such carbon filters are commercially available from Purolator Air Filtration, a division of Clarcor Company of Henderson, NC 27536 under their Part No. FME 40 CB.

A pair of fasteners 46 are used to fixedly secure the air filter to the outer sash 26. One of the fasteners 46 is placed on each side of the filter along its perimeter and intermediate its height for securely retaining it in place. The fasteners are provided with holes 48 for receiving sheet metal screws 50 or the like for anchoring the air filter 28 to the sides of the outer sash 26. Alternately, four fasteners (one located adjacent each corner of the filter) could be used for securing the filter in place. The fasteners are of the flush-mount type which are commercially available from L & M Metal Products, Inc. of Baldwin Park, Calif. 91706.

The mounting frame 12 of the adapter unit 10 is provided with a plurality of openings or holes 52 along its top, sides, and bottom frame members 14-20 for receiving mounting means, such as sheet metal screws 54 and locking washers 56. The adapter unit is dimensioned and contoured to be installed or retro-fitted over the existing main split-sash window of school buses of FIGS. 1-4. The openings 52 of the mounting frame are alignable with openings 53 formed in the frame 120 of the main split-sash window so as to receive therethough the screws 54 and washers 56 for installing the adapter unit over the main window. The adapter unit will not obstruct the main window from being repaired or serviced since it can be easily and quickly removed by taking out the screws and washers.

With the adapter unit retro-fitted over the main split-sash window of the school bus so that the adapter opening 21 (the top half) is aligned with and arranged over the upper pane 121 (the top half) of the main split-sash window, the operation of the adapter unit 10 of the present invention will now be explained with reference to FIGS. 5 and 7. Assume initially that the adapter unit is in the inactive or unused state, as shown in FIG. 5, where the outer sash 26 having the air filter 28 is in the lowered position behind the inner sash 30 of the pane of glass. In this inactive state, the pane of glass serves to prevent the air filter 28 from shedding and being exposed to the passengers inside the bus.

When the main split-sash window is opened to the position of FIGS. 3 and 4, if it were not for the present invention small soot particles and toxic gases from the diesel-powered engine would enter through the main window opening and into the interior of the bus. In order to prevent this from occurring, the outer sash 26 having the air filter is moved upwardly and vertically to the active state, as depicted in FIG. 7 wherein the air filter 28 is disposed completely over the main window opening. As a result, the outside air is allowed to be filtered and captures most of the diesel fumes before it blows therethough and enters the interior of the bus.

While the adapter unit 10 of FIGS. 5 and 7 is designed to operate with a conventional school bus main split-sash window which is opened by lowering the upper pane thereof, the inventor has also envisioned that the invention is likewise operable with a split-sash window which is opened by raising the lower pane thereof. Accordingly, a second embodiment of a filter window adapter unit 10a of the present invention is illustrated in FIGS. 10 and 11. The adapter unit 10a is substantially identical in its construction and operation as the adapter unit 10, except that it is designed to be retro-fitted over a split-sash window which is opened by raising the lower pane. In particular, the adapter opening 21a (lower half) is aligned with and disposed over the main window opening (lower half).

In FIG. 10, the adapter unit 10a is in the inactive state where the outer sash 26a having the air filter 28a is in the upper position behind the inner sash 30a of the pane 32a of glass. In this inactive state, the pane 32a of glass serves to prevent the air filter 28a from shedding and being exposed to the passengers inside the bus.

When the lower pane of the main split-sash window is raised to create the main opening, the outer sash 26a having the air filter 28a is moved downwardly and vertically to the active state, as depicted in FIG. 11 wherein the air filter 28a is disposed completely over the main window opening. As a result, the outside air is again allowed to be filtered and captures most of the diesel fumes before it blows therethough and enters the interior of the bus.

From the foregoing detailed description, it can thus be seen that the present invention provides a filter window adapter unit which includes a mounting frame adapted to be installed over a main split-sash window of school buses and an outer sash with an air filter being movable so as to cover a main window opening when the main split-sash window is opened. As a result, there is prevented the diesel fumes from entering the interior of the bus which can cause health problems.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

The invention claimed is:

1. A filter window adapter unit adapted for use with a main split-sash window of a school bus, said adapter unit comprising:

a mounting frame adapted to be installed over the main split-sash window of the school bus and including a top frame member, opposed side frame members, and a bottom frame member all formed integrally together to define an adapter window opening;

an outer track portion being formed in said opposed side frame members and extending between said top and bottom frame members;

an inner track portion being formed in said opposed side frame members adjacent to said outer track portion and extending between said top and bottom frame members;

an inner sash disposed fixedly in a lower position in said inner track portion and carrying a pane of glass;

an outer sash disposed movably in said outer track portion and carrying an air filter; said outer sash being raised upwardly so as to cover a main window opening in the school bus when the main split-sash is opened;

said air filter being dimensioned with a width and a height so as to cover the main window opening in the school bus;

said air filter being formed of an activated carbon filter type which has relative adsorptive ability of diesel fumes;

said mounting frame being formed with a plurality of openings which are aligned with corresponding openings in a frame of the main window opening of the school bus for receiving mounting means therethough so as to install said adapter unit over the main split-sash window of the school bus; and said air filter preventing the diesel fumes from the school bus from entering into the interior thereof.

2. A filter window adapter unit as claimed in claim 1, wherein said outer sash is provided with opposed spring-loaded bolts located on the top part thereof and on each side therein, said spring-loaded bolts being movable inwardly toward each other and away from respective apertures so as to permit said outer sash to move upwardly.

3. A filter window adapter unit as claimed in claim 2, wherein said bolts are provided with levers for accommodating fingers of a user so as to pinch the same simultaneously toward each other in order to free said outer sash.

4. A filter window adapter unit as claimed in claim 1, wherein said outer sash is of a generally rectangular shape and includes a ledge portion for receiving said air filter therein.

5. A filter window adapter unit as claimed in claim 4, further comprising a plurality of fasteners for fixedly securing said air filter to said outer sash.

6. A filter window adapter unit as claimed in claim 1, wherein said outer sash is positioned in a lower position behind said inner sash when it is in an inactive state to prevent the air filter from shedding.

7. A filter window adapter unit as claimed in claim 6, wherein said outer sash is moved upwardly to an active state so that the air filter is disposed completely over the main window opening.

8. A filter window adapter unit adapted for use with a main split-sash window of a school bus, said adapter unit comprising:

a mounting frame adapted to be installed over the main split-sash window of the school bus and including a top frame member, opposed side frame members, and a bottom frame member all formed integrally together to define an adapter window opening;

an outer track portion being formed in said opposed side frame members and extending between said top and bottom frame members;

an inner track portion being formed in said opposed side frame members adjacent to said outer track portion and extending between said top and bottom frame members;

an inner sash disposed fixedly in an upper position in said inner track portion and carrying a pane of glass;

an outer sash disposed movably in said outer track portion and carrying an air filter;

said outer sash being moved downwardly so as to cover a main window opening in the school bus when the main split-sash is opened;

said air filter being dimensioned with a width and a height so as to cover the main window opening in the school bus;

said air filter being formed of an activated carbon filter type which has relative adsorptive ability of diesel fumes;

said mounting frame being formed with a plurality of openings which are aligned with corresponding openings in a frame of the main window opening of the school bus for receiving mounting means therethough so as to install said adapter unit over the main split-sash window of the school bus; and said air filter preventing the diesel fumes from the school bus from entering into the interior thereof.

9. A filter window adapter unit as claimed in claim 8, wherein said outer sash is positioned in an upper position behind said inner sash when it is in an inactive state to prevent the air filter from shedding.

10. A filter window adapter unit as claimed in claim 9, wherein said outer sash is moved downwardly to an active state so that the air filter is disposed completely over the main window opening.

* * * * *